(12) United States Patent
Mavrofrides

(10) Patent No.: US 9,682,597 B1
(45) Date of Patent: Jun. 20, 2017

(54) WHEEL WITH INTERCHANGEABLE CAPS

(71) Applicant: Demetrios Mavrofrides, Orlando, FL (US)

(72) Inventor: Demetrios Mavrofrides, Orlando, FL (US)

(*) Notice: Subject to any disclaimer, the term of this patent is extended or adjusted under 35 U.S.C. 154(b) by 6 days.

(21) Appl. No.: 14/286,325

(22) Filed: May 23, 2014

(51) Int. Cl.
*B60B 7/06* (2006.01)
*B60B 7/10* (2006.01)
*B60B 7/00* (2006.01)

(52) U.S. Cl.
CPC .................. *B60B 7/0013* (2013.01)

(58) Field of Classification Search
CPC ... B60B 7/0013; B60B 7/0066; B60B 7/0073; B60B 7/008; B60B 7/04; B60B 7/06; B60B 7/066; B60B 7/068; B60B 7/10; B60B 7/12
See application file for complete search history.

(56) References Cited

U.S. PATENT DOCUMENTS

| | | | |
|---|---|---|---|
| 3,528,705 A | 9/1970 | Oldroyd | |
| 4,040,672 A * | 8/1977 | Imahashi | B60B 7/14 220/233 |
| 4,295,685 A * | 10/1981 | Spisak | B60B 7/04 301/108.3 |
| 4,547,021 A | 10/1985 | Abbate Daga | |
| 4,781,419 A | 11/1988 | Boothe | |
| 5,064,249 A | 11/1991 | Hung | |
| 5,152,584 A | 10/1992 | Maxwell | |
| 5,443,582 A * | 8/1995 | Ching | B60B 7/14 301/37.26 |
| 5,464,276 A | 11/1995 | Ott | |
| 5,494,336 A | 2/1996 | Russell | |
| 5,584,537 A | 12/1996 | Miansian | |
| 5,630,653 A | 5/1997 | Polka | |
| 5,890,773 A | 4/1999 | Wright | |
| 6,238,007 B1 | 5/2001 | Wieczorek | |
| 6,502,308 B1 | 1/2003 | Carfora | |
| 7,416,260 B1 * | 8/2008 | Cuevas | B60B 7/08 301/37.106 |
| D677,609 S | 3/2013 | Sabblah | |
| 2003/0020322 A1 * | 1/2003 | Zaniboni | B60B 7/0013 301/37.101 |
| 2005/0179311 A1 * | 8/2005 | Barney | B60B 7/04 301/37.35 |
| 2006/0158021 A1 * | 7/2006 | Dagh | B60B 7/04 301/37.376 |
| 2015/0224819 A1 | 8/2015 | Huusmann | |

* cited by examiner

*Primary Examiner* — Frank Vanaman

(74) *Attorney, Agent, or Firm* — Brian S. Steinberger; Law Offices of Brian S. Steinberger, PA

(57) ABSTRACT

Systems, apparatus, devices, brackets, assemblies, and methods for a wheel hub with interchangeable caps for changing the appearance of wheels having exposed lug nuts about a center hole. A bracket having both a small cap and a large cap can be used on an existing wheel which exposes a center hole and the lug nuts. A smaller cap can be used to cover only the center hole of the wheel. A larger cap can be used to cover both the center hole and the exposed lug nuts on the wheel. The bracket is a base that allows for either a small cap or large cap to be interchangeably used to change the exterior appearance of the wheel. The bracket can be integrated with the wheel, or be attachable onto the wheel.

8 Claims, 15 Drawing Sheets

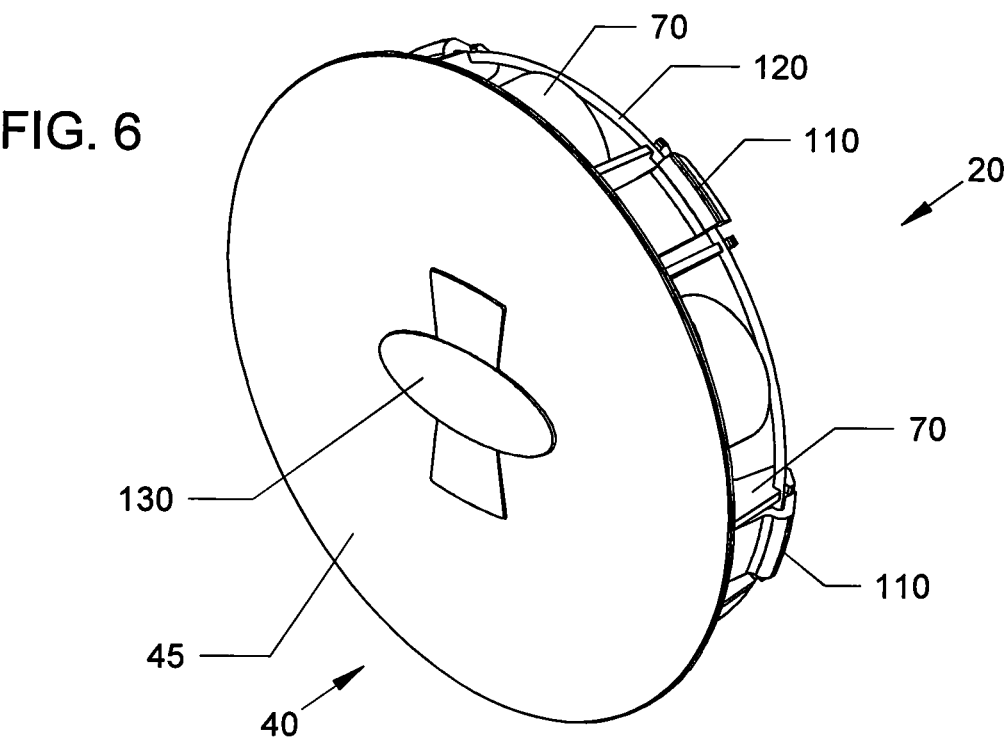
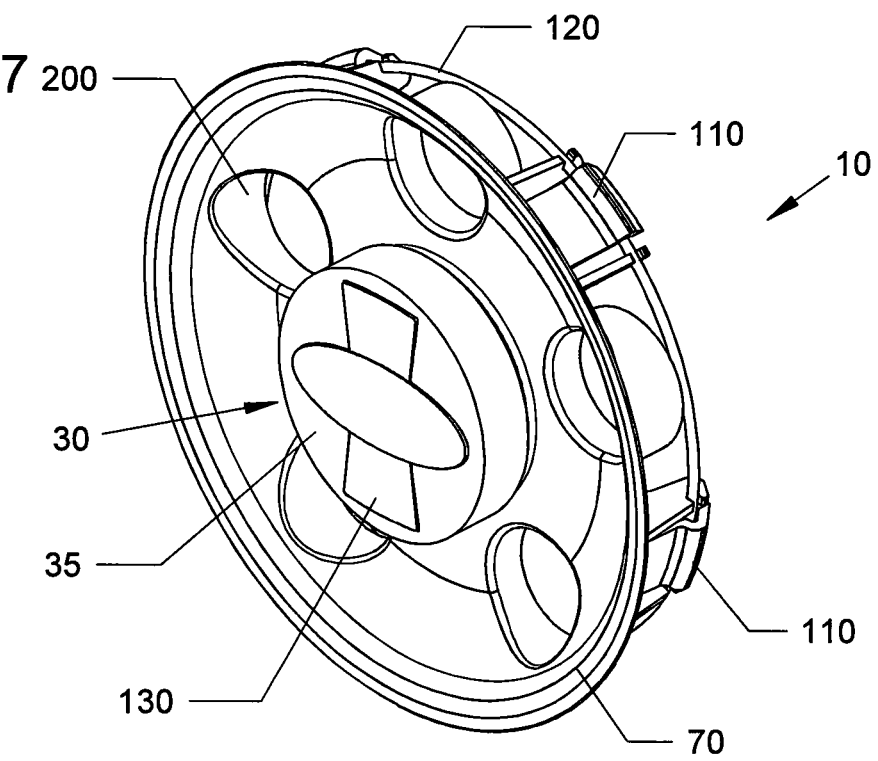

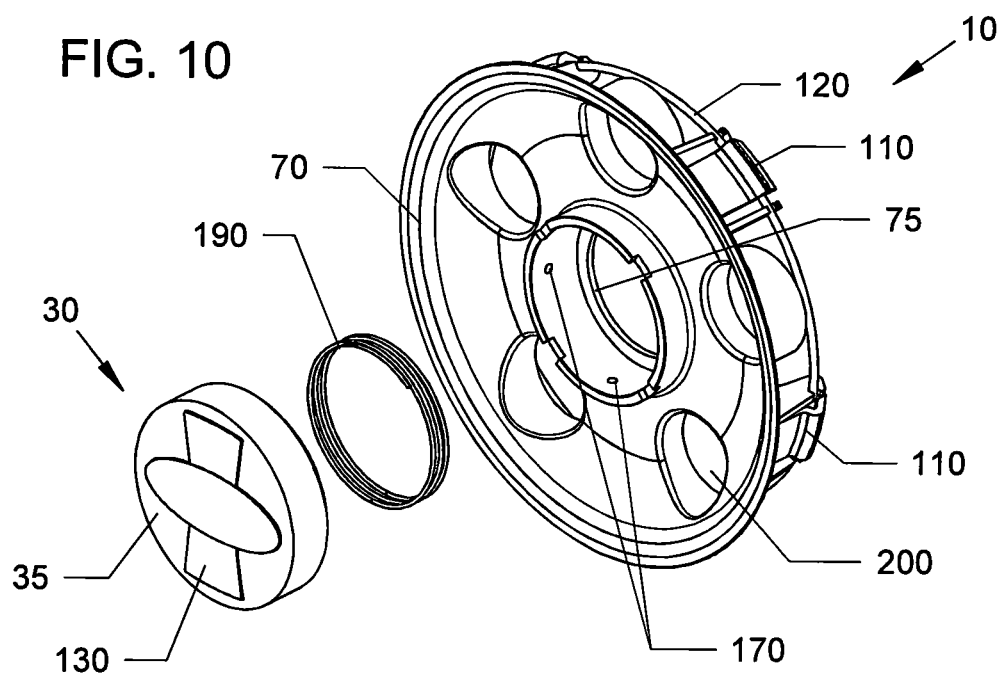
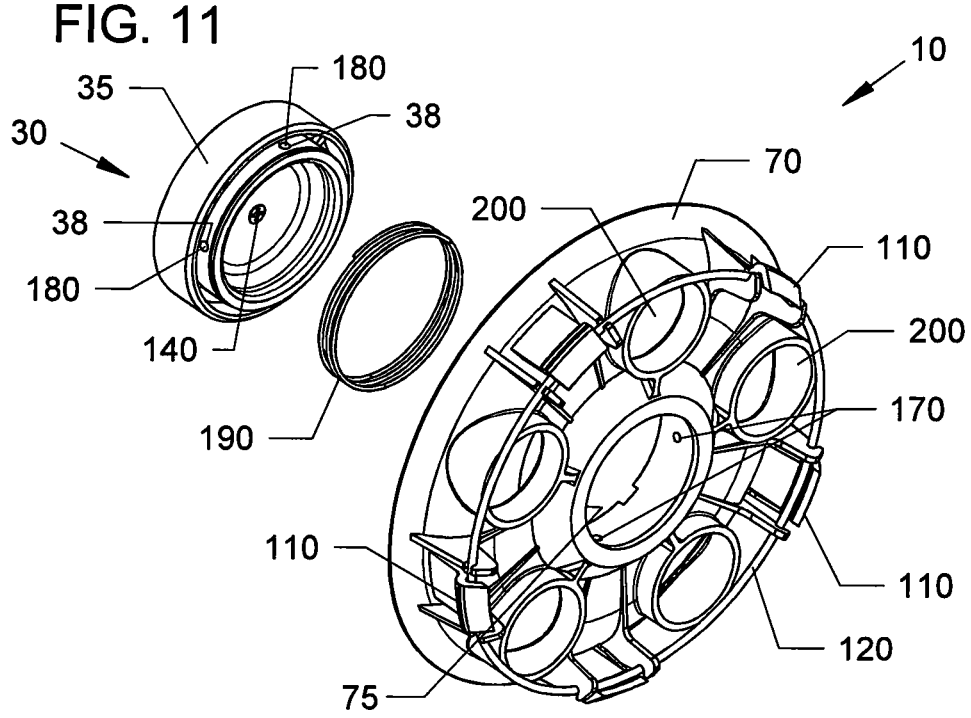

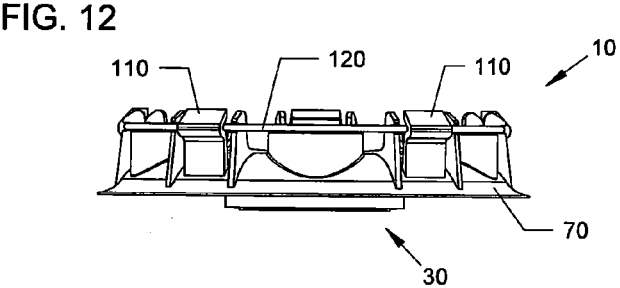
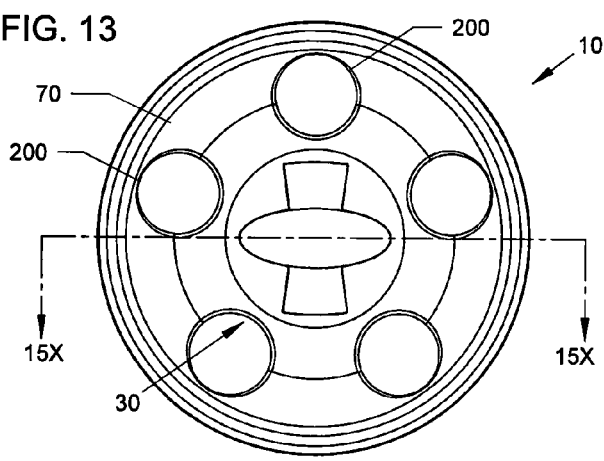
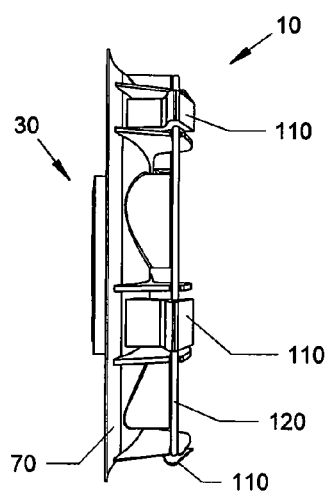

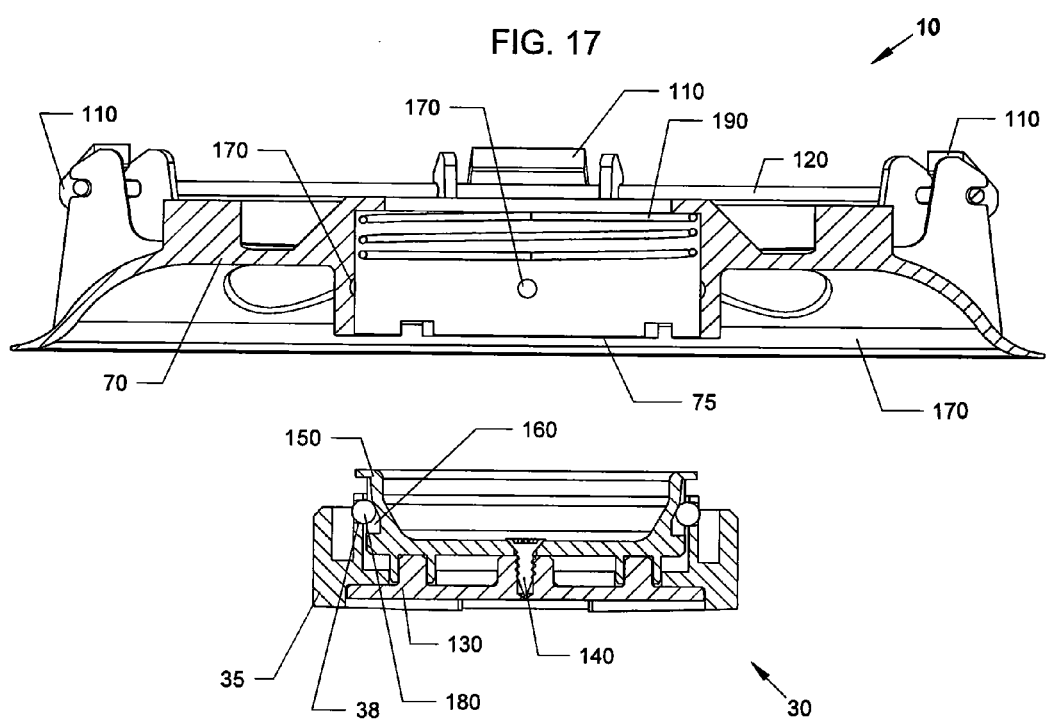

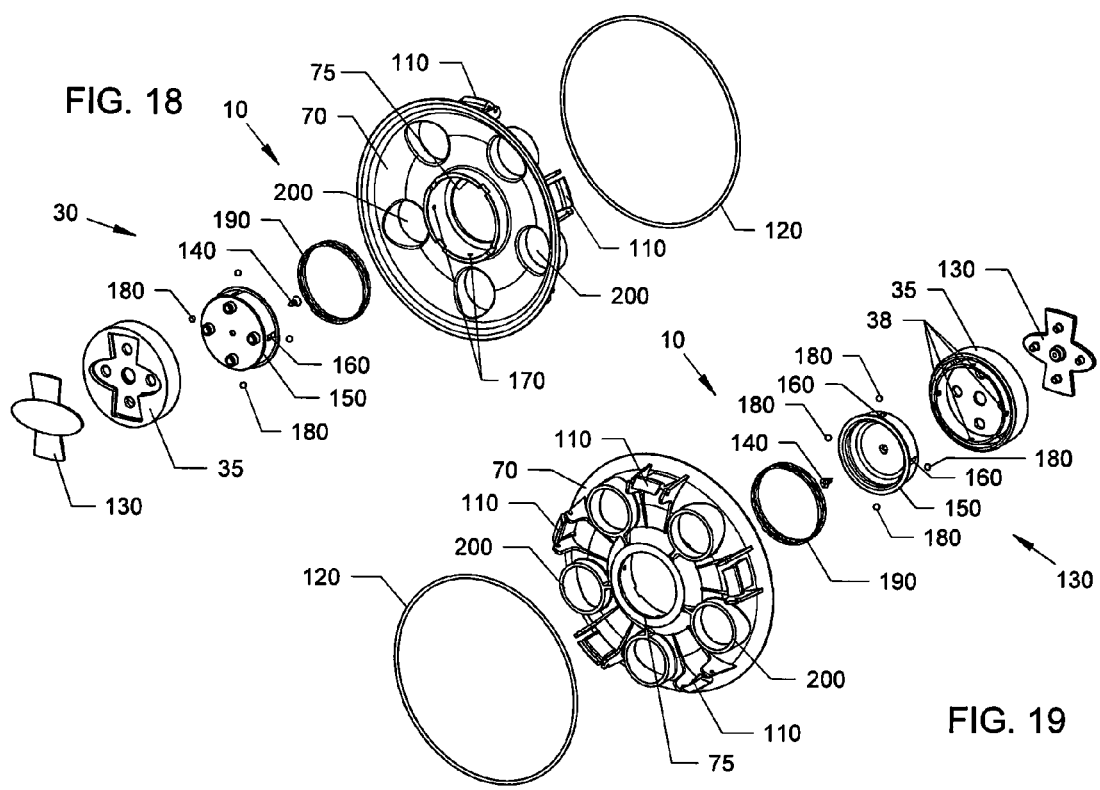

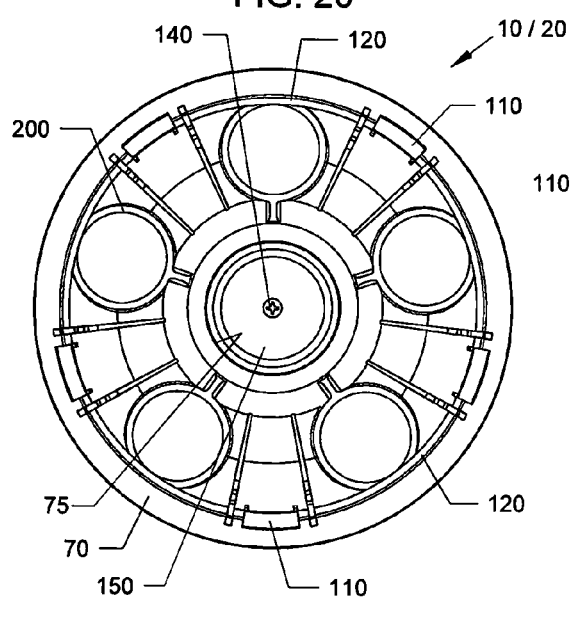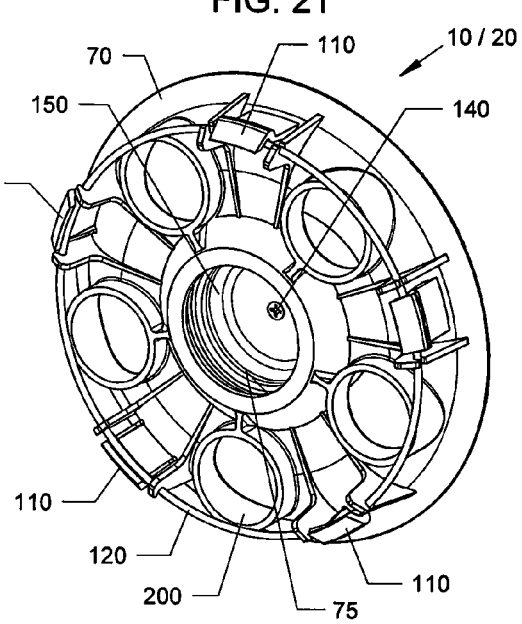

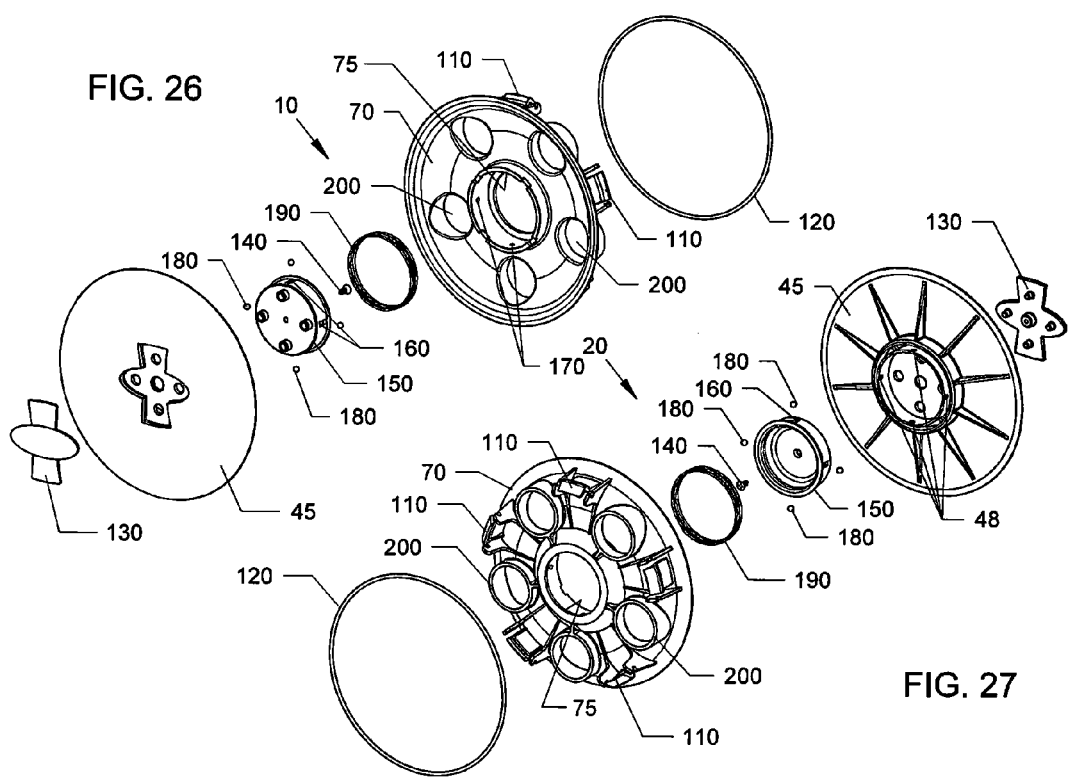

WHEEL WITH INTERCHANGEABLE CAPS

FIELD OF INVENTION

This invention relates to vehicles, and in particular to apparatus, devices, brackets assemblies, systems and methods for changing the appearance and style of wheels having lug nuts about a center hole with a bracket that allows for interchanging a small cap to cover only the center hole and a larger cap for covering both the center hole and surrounding lug nuts.

BACKGROUND AND PRIOR ART

The majority of wheels used on vehicles, such as on automobiles have often showed lug nuts about a center opening. Various types of wheels and hubs have allowed for a single cap to close off the center hole in the middle of the wheel while others close off the surrounding lug nuts in addition to the center hole. However, to change the appearance of the wheel style by exposing or hiding the lug nuts, the vehicle owner would have to remove all the tires from the wheels and replace each entire wheel with another wheel which allows for a hub cap to completely cover the lug nuts and center hole or just the center hole. This is because automotive wheels are designed to accept one type of cap that has a single function to either cover the center hole only or both the center hole and also the lug nuts.

Having to remove the tires from the wheels to change the style is both time consuming and expensive. The user would have to purchase two separate wheels for each of the wheels on the vehicle, which would come to two sets of wheels for changing the appearance of the wheels on a normal vehicle having four wheels and tires. As a result, the time and labor to replace the wheels makes changing the appearance of the wheels undesirable and out of the reach to most vehicle owners.

Thus, the need exists for solutions to the above problems with the prior art.

SUMMARY OF THE INVENTION

A primary objective of the present invention is to provide apparatus, devices, brackets, assemblies, systems and methods for changing the appearance and style of wheels having lug nuts about a center hole with a bracket that allows for interchanging a small cap to cover only the center hole and a larger cap for covering both the center hole and surrounding lug nuts A secondary objective of the present invention is to provide apparatus, devices, brackets, assemblies, systems and methods for changing the appearance and style of wheels having lug nuts about a center hole without having to remove the tire from the wheel.

A third objective of the present invention is to provide apparatus, devices, brackets, assemblies, systems and methods for changing the appearance and style of wheels having lug nuts about a center hole, by just changing cap covers.

A wheel assembly for a vehicle, that includes a bracket on an exposed side of a vehicle wheel having a front side showing an appearance of lug nuts surrounding a center hole, and a plurality of interchangeable caps attachable to the front side of the bracket for changing the appearance of the wheel.

The plurality of caps can include a first cap attachable to the front side of the bracket for covering the center hole on the wheel, and a second cap larger than the first cap for being attachable to the front side of the bracket for covering both the lug nuts and the center hole.

The bracket can be integrated with the exposed side of the wheel. The bracket can have a rear side that is attachable to the exposed side of the wheel.

The wheel assembly can further include a second bracket on an exposed side of a second vehicle wheel having front side showing an appearance of lug nuts surrounding a center hole, a second plurality of interchangeable caps attachable to the front side of the second bracket for changing the appearance of the second wheel, a third bracket on an exposed side of a third vehicle wheel having a front side showing an appearance of lug nuts surrounding a center hole, a third plurality of interchangeable caps attachable to the front side of the third bracket for changing the appearance of the third wheel, a fourth bracket on an exposed side of a fourth vehicle wheel having a front side showing an appearance of lug nuts surrounding a center hole, and a fourth plurality of interchangeable caps attachable to the front side of the fourth bracket for changing the appearance of the fourth wheel.

Each of the plurality of caps can include a first cap attachable to the front side of the bracket for covering the center hole on the wheel, and a second cap larger than the first cap for being attachable to the front side of the bracket for covering both the lug nuts and the center hole.

Each of the second bracket, the third bracket and the fourth bracket can be integrated with the exposed side of the their respective wheel. Each of the second bracket, the third bracket and the fourth bracket can have a rear side that is attachable to the exposed side of the respective wheel.

A method of changing the appearance of a wheel having lug nuts surrounding a center hole with interchangeable caps, can include the steps of providing a wheel with a bracket on an exposed side of the wheel, the bracket having a front side with lug nuts surrounding a central opening, providing a plurality of caps that are each attachable to the front side of the bracket, and changing appearance of the exterior surface of the wheel with each of the interchangeable caps.

The step of providing a plurality of caps, can include steps of providing a first cap, and providing a second cap having a larger diameter than the first cap.

The step of changing the appearance of the exterior surface of the wheel can include the step of attaching the first cap to the front of the bracket to cover the center hole of the exterior surface of the wheel, while leaving the lug nuts exposed.

The step of changing the appearance of the exterior surface of the wheel can include the step of attaching the second cap to the front of the bracket to cover both the lug nuts and the center hole of the exterior surface of the wheel.

The step of changing the appearance of the exterior surface of the wheel can include the step of interchangeably attaching the first cap and the second cap to the front of the bracket in order to cover only the center hole or to cover both the lug nuts and the center hole.

The method can include the step of providing the bracket is integrated with the exposed side of the wheel.

The method can include the steps of providing the bracket with a rear side, and attaching the rear side of the bracket to the exposed side of the wheel.

The method can include the steps of providing a second bracket on an exposed side of a second wheel, the second bracket having a front side with lug nuts surrounding a central opening, providing a second plurality of caps that are each attachable to the front side of the second bracket, changing appearance of the exterior surface of the second wheel with each of the second interchangeable caps, providing a third bracket on an exposed side of a second wheel, the third bracket having a front side with lug nuts surrounding a central opening, providing a third plurality of caps that are each attachable to the front side of the third bracket, changing appearance of the exterior surface of the third wheel with each of the third interchangeable caps, providing a fourth bracket on an exposed side of a fourth wheel, the second bracket having a front side with lug nuts surrounding a central opening, providing a fourth plurality of caps that are each attachable to the front side of the fourth bracket, and changing appearance of the exterior surface of the fourth wheel with each of the fourth interchangeable caps.

A base bracket for changing appearances of a wheel hub, can include a bracket on an exposed side of a wheel hub having a front side showing an appearance of lug nuts surrounding a center hole, and interchangeable caps attachable to the front side of the bracket for changing the appearance of the wheel. The interchangeable caps can include a first cap attachable to the front side of the bracket for covering the center hole on the wheel hub, and a second cap larger than the first cap for being attachable to the front side of the bracket for covering both the lug nuts and the center hole of the wheel hub.

The base bracket can further include a second bracket on an exposed side of a second wheel hub having a front side showing an appearance of lug nuts surrounding a center hole, second interchangeable caps attachable to the front side of the second bracket for changing the appearance of the second wheel hub, a third bracket on an exposed side of a third wheel hub having a front side showing an appearance of lug nuts surrounding a center hole of the wheel hub, third interchangeable caps attachable to the front side of the third bracket for changing the appearance of the third wheel hub, a fourth bracket on an exposed side of a fourth wheel hub having a front side showing an appearance of lug nuts surrounding a center hole of the fourth wheel hub, and fourth interchangeable caps attachable to the front side of the fourth bracket for changing the appearance of the fourth wheel hub.

Each of the interchangeable caps can include a first cap attachable to the front side of the bracket for covering the center hole on each wheel hub, and a second cap larger than the first cap for being attachable to the front side of the bracket for covering both the lug nuts and the center hole of each wheel hub.

Further objects and advantages of this invention will be apparent from the following detailed description of the presently preferred embodiments which are illustrated schematically in the accompanying drawings.

BRIEF DESCRIPTION OF THE FIGURES

FIG. 6 is a front right perspective view of the large cover assembly with large cap.

FIG. 7 is a front right perspective view of the small cover assembly with small cap.

FIG. 10 is another perspective view of the small cover assembly of FIG. 7 with small cap assembly pulled out.

FIG. 11 is a rear perspective view of the small cover assembly with small cap assembly of FIG. 10.

FIG. 12 is a top side view of the cover assembly of FIG. 10 with small cap installed.

FIG. 13 is a front view of the cover assembly and small cap of FIG. 12.

FIG. 14 is a right side view of the cover assembly with small cap of FIG. 12.

The system is the same for both cap sizes.

Figure 15:
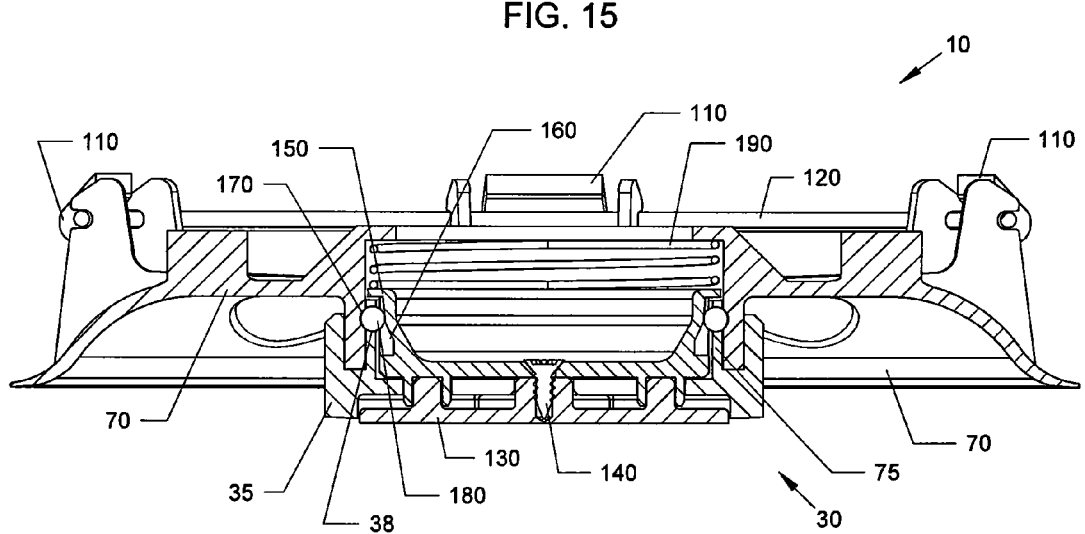
FIG. 15. A cross-sectional view of cover assembly with small cap of FIG. 13 along arrow 15X showing how the ball bearing retaining system works.

FIG. 17 is another view of the cover assembly of FIG. 15 with the cap assembly removed from the base bracket.

FIG. 18 is a front right exploded perspective view of the wheel cover assembly with the small cap.

FIG. 19 is a rear perspective view of the exploded wheel cover assembly and small cap of FIG. 18.

FIG. 20 is a rear view of the cover assembly of the preceding figures. Both cap variations are the same from this side.

FIG. 21 is a rear perspective view of the cover assembly of FIG. 20.

Figure 22:
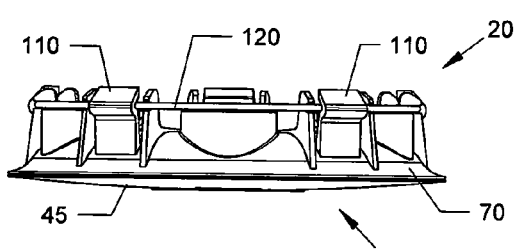

FIG. 22 is a top side view of the cover assembly of FIGS. 19-20 with large cap installed.

Figure 23:
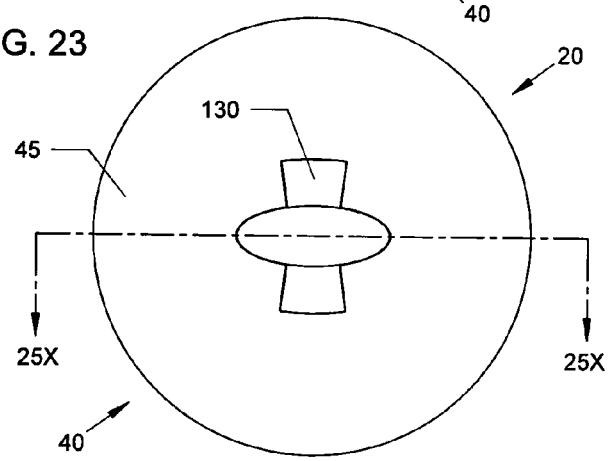

FIG. 23 is a front view of the cover assembly with large cap installed of FIG. 22.

Figure 24:
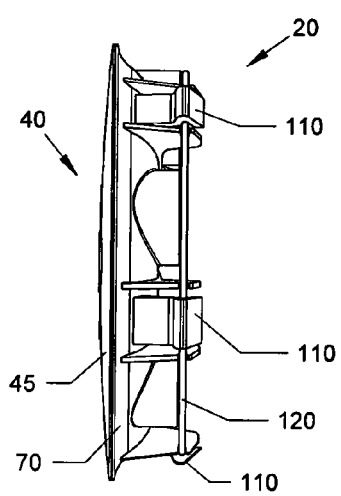

FIG. 24 is a right side view of the cover assembly with large cap installed of FIG. 22.

Figure 25:
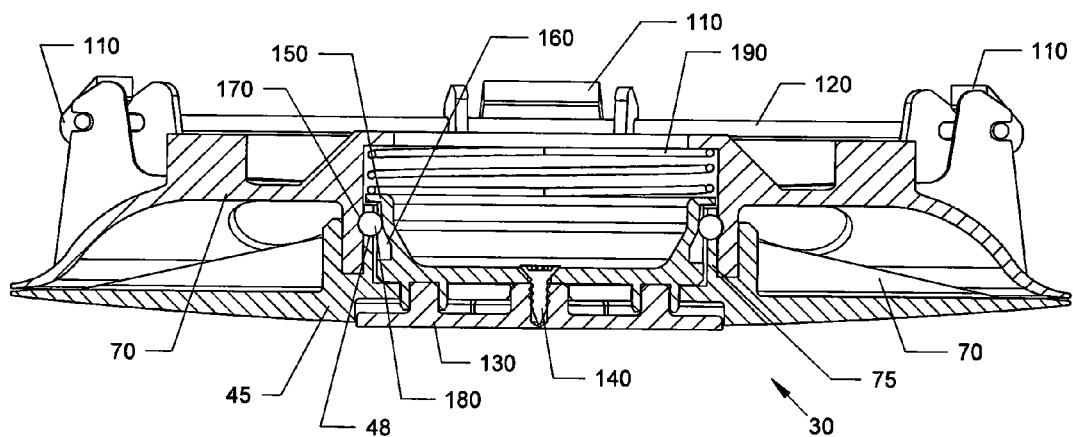

FIG. 25 is a cross-sectional view of the cover assembly with large cap installed of FIG. 23 along arrow 25X.

FIG. 26 is a front exploded view of the wheel cover assembly showing large cap installed of FIG. 22.

FIG. 27 is a rear view of the exploded view of the wheel cover assembly with large cap of FIG. 26.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
10 Wheel cover bracket assembly with small cap.
20 Wheel cover bracket assembly with large cap.
30 Small cap assembly.
35 Small cap.
38 Bearing retaining bore in small cap.
40 Large cap assembly.
45 Large cap.
48 Bearing retaining bore in large cap.
50 Car wheel/hub.
70 Base.
75. Cylindrical center receptacle
80 Center bore of wheel.
90 Lug nut hole of wheel.
100 Lug nut.
110 Base retaining tabs.
120 Base retaining tab hoop spring.
125 Retainer groove in wheel.
130 Emblem/release button.
140 Screw.
150 Cap retainer.
160 Cap retainer bearing guide.
170 Base bearing pocket.
180 Ball bearing.
190 Cap retainer coil spring.
200 Lug nut hole in base.

Figure 1:
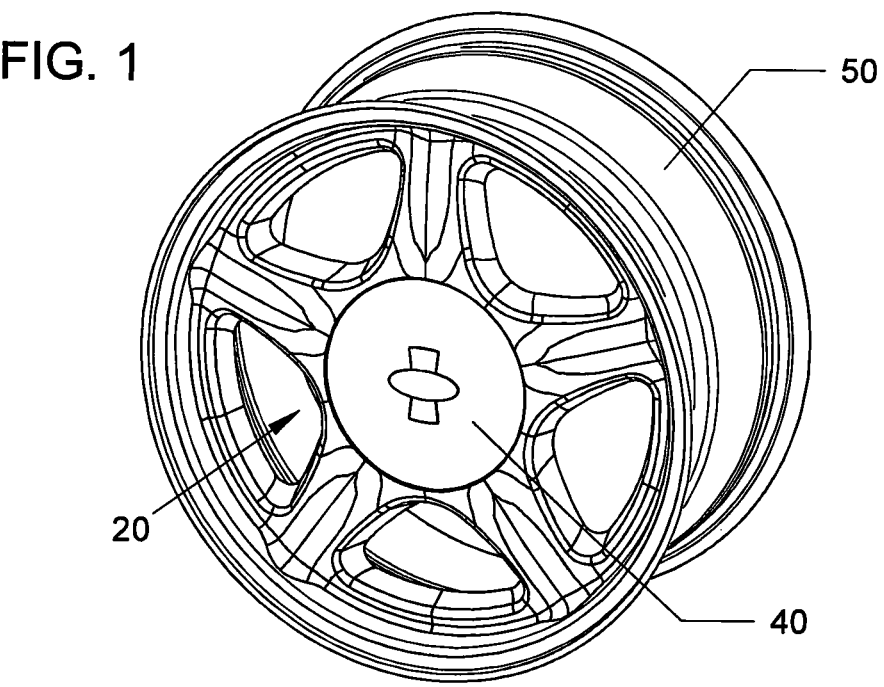
FIG. 1 is a front perspective view of a vehicle wheel with large cover bracket assembly and large cap assembly installed.
Figure 2:
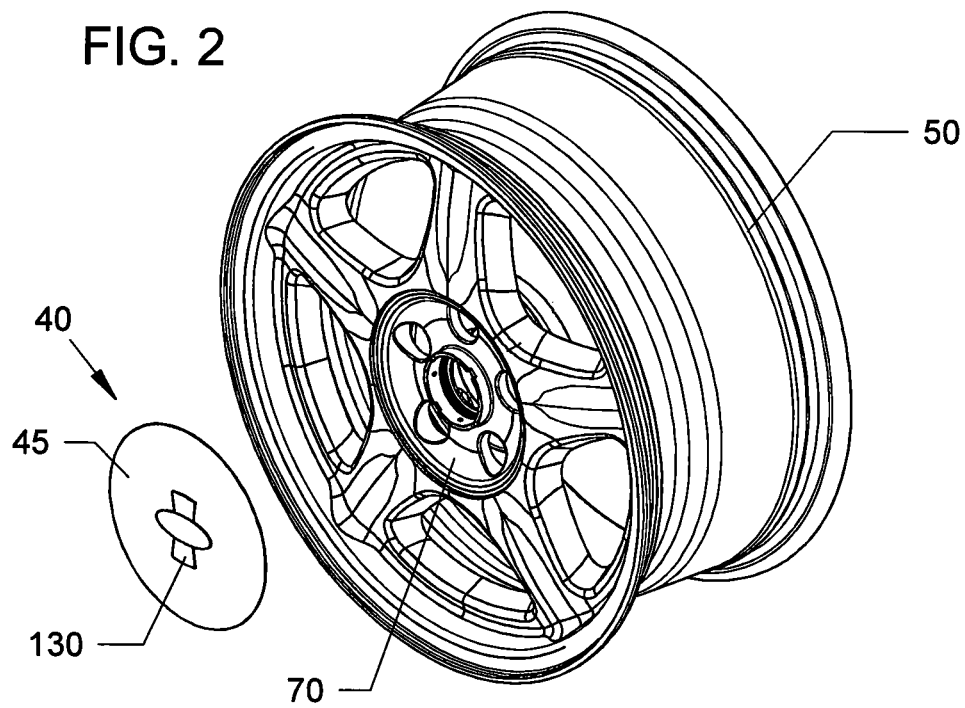
FIG. 2 is a front right perspective view of the wheel of FIG. 1 with base bracket of the large cover assembly installed on the wheel and the large cap pulled out.

FIG. 1 is a front perspective view of a vehicle wheel 50 with large cover bracket assembly 20 and large cap assembly 40 installed. FIG. 2 is a front right perspective view of the wheel 50 of FIG. 1 with base bracket 70 of the large cover assembly 20 installed on the wheel 50 and the large cap assembly 40 pulled out. The exterior of the large cap assembly 40 includes a large cap 45 along with a push button emblem 130, that will be described in more detail later.

Figure 3:
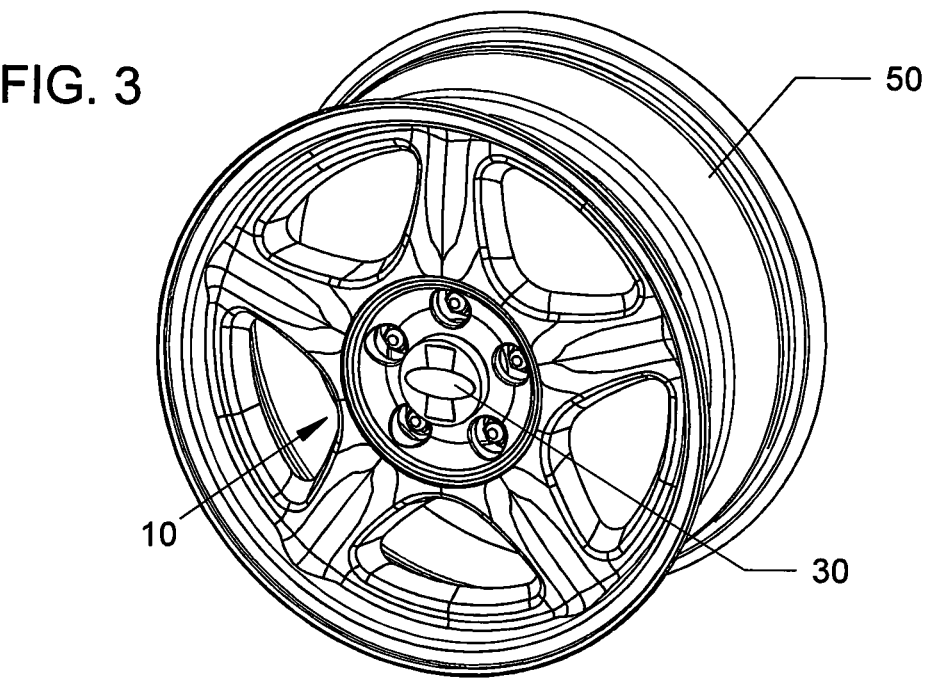
FIG. 3 is a front perspective view of the wheel of FIG. 1 with a small cover bracket assembly installed over the base bracket.
Figure 4:
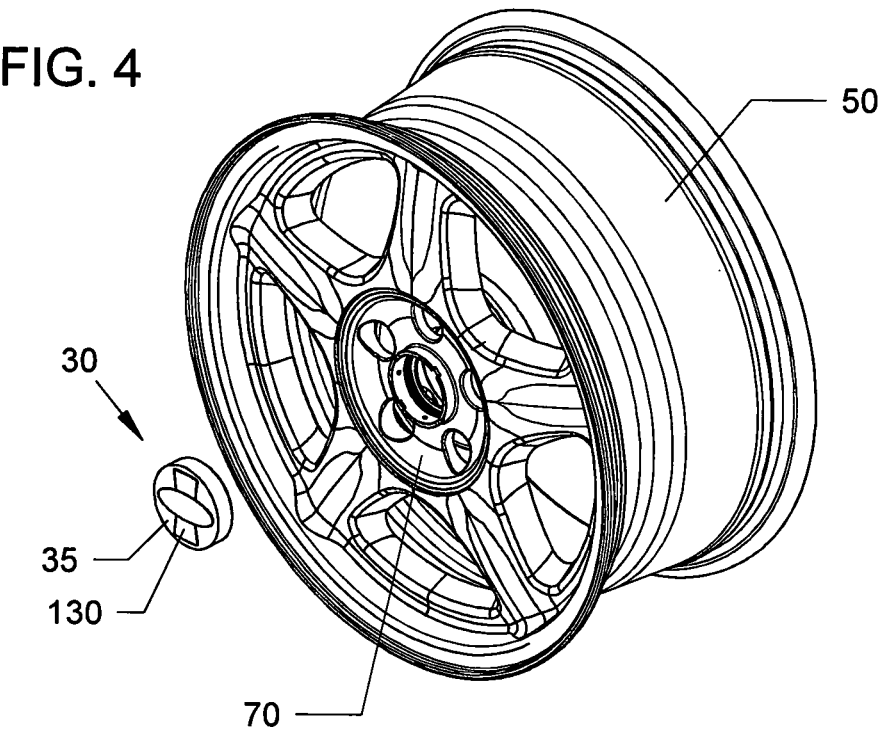
FIG. 4 is a front right perspective view of the wheel of FIG. 3 with base bracket of the small cover bracket assembly installed and small cap assembly pulled out.

FIG. 3 is a front perspective view of the wheel 50 of FIG. 1 with a small cover bracket assembly 10 installed over the base bracket 70. FIG. 4 is a front right perspective view of the wheel of FIG. 3 with base bracket 70 of the small cover bracket assembly 10 installed and the small cap assembly 30 pulled out. The exterior of the small cap assembly 30 includes a small cap 35 along with a push button emblem 130, which will be described in more detail later.

Figure 5:
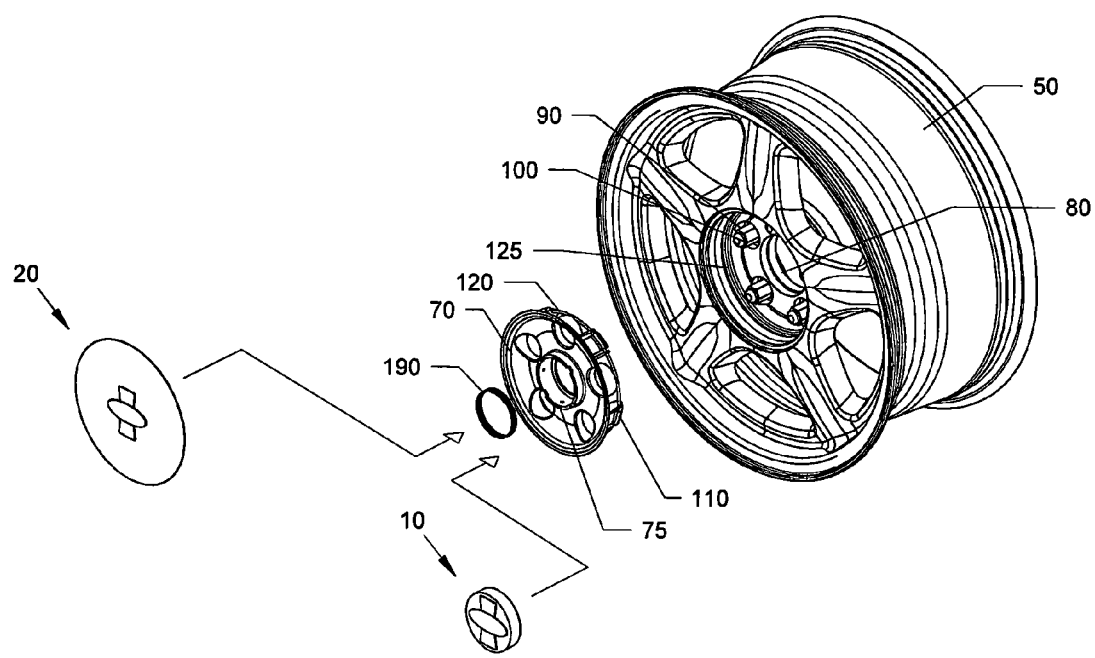
FIG. 5 is an exploded front right perspective view of the wheel of the preceding figures with separated base bracket and both the large cap and small cap.

FIG. 5 is an exploded front right perspective view of the wheel 50 of the preceding figures with separated base bracket 70 and large cap assembly 20 and small cap assembly 10. The cap retainer coil spring 190 can be sized to fit inside the cylindrical center receptacle 75 in the base bracket 70

FIG. 6 is a front right perspective view of the large cover assembly 20 with the large cap assembly 40, with the base bracket 70 with base retaining hoop spring 120 held to the bracket 70 by base retaining tabs 110.

FIG. 7 is a front right perspective view of the small cover assembly 10 with small cap assembly 30 with the base bracket 70 with base retaining hoop spring 120 held to the bracket 70 by base retaining tabs 110.

Figure 8:
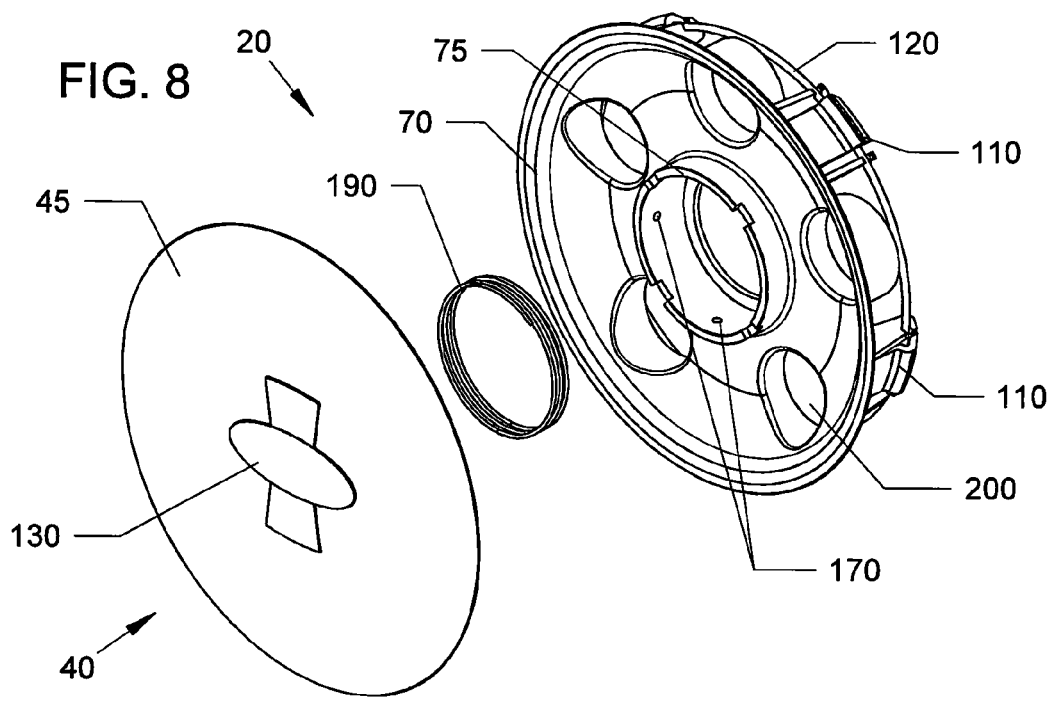
FIG. 8 is another perspective view of the large cover assembly of FIGS. 5-6 with large cap assembly pulled out.
Figure 9:
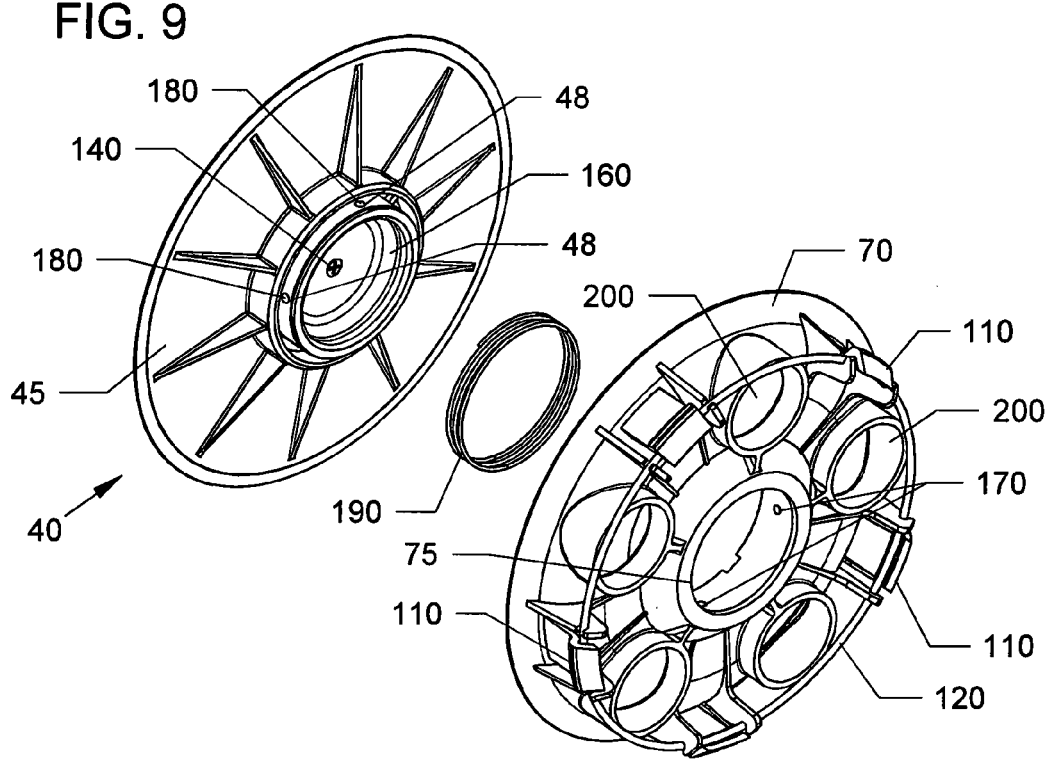
FIG. 9 is a rear perspective view of the large cover assembly with large cap assembly of FIG. 8.

FIG. 8 is another perspective view of the large cover assembly 20 of FIGS. 5-6 with large cap assembly 40 pulled out. FIG. 9 is a rear perspective view of the cover assembly with large cap of FIG. 8.

FIG. 10 is another perspective view of the small cover assembly 10 of FIG. 7 with small cap assembly 30 pulled out, and showing base retaining hoop spring 120 held to the bracket 70 by base retaining tabs 110.

FIG. 11 is a rear perspective view of the small cover assembly 10 with small cap assembly 30 of FIG. 10, and showing base retaining hoop spring 120 held to the bracket 70 by base retaining tabs 110.

FIG. 12 is a top side view of the small cover assembly 10 of FIG. 10 with small cap assembly 30 installed. FIG. 13 is a front view of the small cover assembly 10 and small cap assembly 30 of FIG. 12. FIG. 14 is a right side view of the small cover assembly 10 with small cap assembly 30 of FIG. 12.

FIG. 15. A cross-sectional view of small cover assembly 10 with small cap of FIG. 13 along arrow 15X showing how the ball bearing retaining system works.

Figure 16:
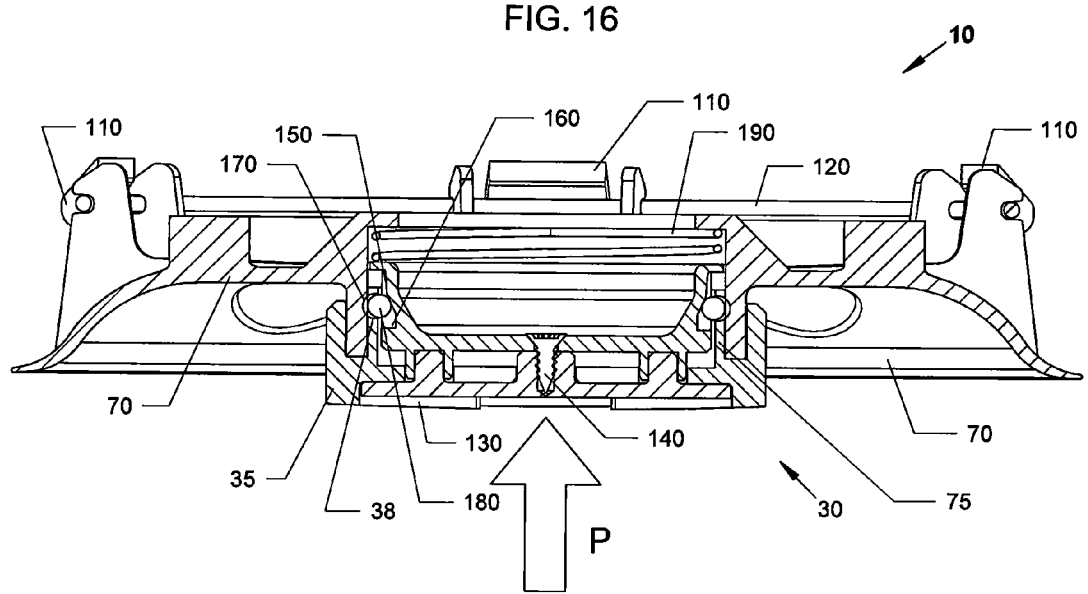
FIG. 16 is another view of the cover assembly of FIG. 15 with emblem/release button pushed up showing that the ball bearings fall away from the base bearing pockets allowing the cap assembly to be removed from the base.

FIG. 16 is another view of the small cover assembly of FIG. 15 with emblem/release button 130 pushed up in the direction of arrow P into the small cap 35 showing that the ball bearings 180 (in bearing retaining bore 38) fall away from the base bearing pockets 170 pushing to compress coil spring 190 allowing the small cap assembly 30 to be removed from the base bracket 70. The system is the same for both small and large cap sizes.

FIG. 17 is another view of the small cover assembly 10 of FIG. 15 with the cap assembly 30 removed from the base bracket 70.

The small cap assembly 30 of FIG. 15 is held in place by the ball bearings 180 which are, in turn, held captive by the small cap 35 and the cap retainer 150. The bearing retainer bore 38 can be conical with the larger opening on the inside closest to the cap retainer 150. Therefore, the ball bearing 180 cannot move beyond the inner surface of the small cap 35. However, it does protrude enough to engage the base bearing pocket 170 when the cap retainer 150 is pushed out or down, with respect to FIG. 15, by the retainer coil spring 190.

As the cap retainer 150 is pushed out, the cap retainer bearing guide 160 becomes narrower and, as a result, the ball bearing 180 is pushed fully into the conical bearing retaining bore 38 and base bearing pockets 170. At that point, the movement of the cap retainer 150 is limited, as is that of the emblem 130, since they are attached with a screw 140. With the pressure on the ball bearing 180 into the base bearing pocket 170 from the coil spring 190 and the cap retainer 150, and the ball bearing being enclosed by the conical bearing retaining bore 38, the cap small cap assembly 30 is locked onto the base 70.

Referring to FIGS. 16-17, the small cap assembly 30 can be removed from the small cover assembly 10 by first holding the small cap 35 with one hand. With the small cap being held firmly, the emblem 130 is depressed until its stopping point where the underside of the emblem meets the small cap 35. The direction of movement of the emblem is shown with the arrow in FIG. 16. Note that the small cap is already touching the cylindrical center receptacle 75 of the base 70 and will remain stationary.

The emblem 130 and the cap retainer 150 can be attached with a screw 140. This ensures that the emblem 130 and the cap retainer 150 move as one piece yet can be separated for assembly and disassembly. Once the emblem 130 and the cap retainer 150 are fully depressed, the ball bearing 180 is free to move into the wider portion of the cap retainer bearing guide 160.

With the emblem 130 still being depressed, the small cap assembly 30 is now rotated to the right or left. This motion will cause the ball bearing 180 to fully dislodge from the base bearing pocket 170 and move partially into the wider portion of the cap retainer bearing guide 160 and not protrude beyond the smaller hole of the conical bearing retaining bore 38. Note that the base 70 is held in place in the wheel by the base retaining tabs 110 and the retainer groove in the wheel 125.

The tension of the base retaining hoop spring 120 firmly locks the base retaining tabs 110 into the retainer groove in the wheel 125 and keeps the base from moving once installed onto the wheel. Note that as the small cap assembly 30 is rotated, both the emblem 130 and the cap retainer 150 move with the small cap 35 since tabs on the cap retainer 150 pass through the small cap 35 and engage the emblem 130.

Now that the small cap assembly 30, has been rotated about the center of the base 70, moving the ball bearing 180 to a flat portion of the base, yet still held captive by the cap retainer 150 and the conical bearing retainer bore 38, the small cap assembly can be removed. The cap retainer coil spring 190 will also push the small cap assembly out of the base 70 and release the small cap assembly 35 as shown in FIG. 17.

The installation of the small cap assembly 30 is the exact reverse procedure for removal of the small cap.

FIG. 18 is a front right exploded perspective view of the small wheel cover assembly 10 with the small cap assembly 30. FIG. 19 is a rear perspective view of the exploded small wheel cover assembly 10 and small cap assembly 30 of FIG. 18.

FIG. 20 is a rear view of the cover assembly 10/20 of the preceding figures. Both cap variations 10/20 are the same from this view. FIG. 21 is a rear perspective view of the cover assembly 10/20 of FIG. 20. The lug nut holes 120 allow for the lug nuts that attach the vehicle wheel 50 to the axle to be exposed. The nut 140 is visible because it secures the cap retainer 150 and the emblem 130 about the small cap 35 and, thus, forming the small assembly 30. The cap retainer 150 functions to lock and unlock the ball bearings into the base bearing pockets 170. There can be more than 1 ball bearing 180 but no less than 2. The cap retainer 150 can be a separate piece of the small cap assembly 30 or large cap assembly 40 but is affixed to and part of those assemblies. The center receptacle is a feature of the base 70 that engages the ball bearings and the small cap 35 or large cap 45.

FIG. 22 is a top side view of the large cover assembly 20 of FIGS. 19-20 with large cap assembly 40 installed. FIG. 23 is a front view of the large cover assembly 20 with large cap assembly 40 installed of FIG. 22. FIG. 24 is a right side view of the large cover assembly 20 with large cap assembly 40 installed of FIG. 22.

FIG. 25 is a cross-sectional view of the large cover assembly 20 with large cap assembly 40 installed of FIG. 23 along arrow 25X.

FIG. 26 is a front exploded view of the large wheel cover assembly 20 showing large cap assembly 40 installed of FIG. 22. FIG. 27 is a rear view of the exploded view of the large wheel cover assembly 20 with large cap assembly 40 of FIG. 26.

Referring to FIGS. 22-27, the large cover assembly 20 and large cap assembly 40 work similar to the small cover assembly 10 and small cap assembly 30, with the exception that the large cap 45 covers both the central receptacle 75 and all of the lug nut holes 20 in the base bracket 70. The large cap assembly 40 and the small cap assembly 30 can share all parts with the exception of the small cap 35 and the large cap 45. Therefore, the installation, function and removal of the large cap assembly 40 is exactly the same as the small cap assembly 30.

The invention can also be practiced with a wheel 50 having a cylindrical center receptacle 75 or base 70 as part of the wheel 50 shown in FIG. 5. The base 70 can be either independent or integrated into the wheel 50 or made part of the wheel 50

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A wheel assembly for a vehicle, comprising:
   a base bracket on an exposed side of a vehicle wheel having a front side with a plurality of lug nut holes surrounding a cylindrical center receptacle with a center hole, the base bracket having a bracket diameter and the center hole having a center hole diameter, the base bracket adaptable to cover a vehicle wheel having a plurality of lug nuts surrounding a center hole, with each of the plurality of lug nut holes having an opening diameter large enough to allow each of the plurality of lug nuts to pass therethrough;
   a plurality of interchangeable caps attachable to the front side of the bracket, the plurality of interchangeable caps comprising:
   a first cap having a centrally located rearwardly protruding cylindrical guide that is attachable within the cylindrical center receptacle of the base bracket, the first cap for covering the center hole in the wheel while leaving the lug nut holes with the lug nuts from the wheel exposed, the first cap having a first cap diameter substantially similar to the center hole diameter; and
   a second cap having a diameter larger than the first cap, the second cap having a centrally located rearwardly protruding cylindrical guide that is attachable within the cylindrical center receptacle of the base bracket, the second cap for covering both the center hole and the lug nut holes of the base bracket which covers the lug nuts from the wheel, the second cap having a diameter substantially similar to a diameter across the lug nut holes, wherein interchanging said first cap and the second cap with each other results in changing the aesthetic appearance of the wheel.

2. The wheel assembly of claim 1, further comprising:
   a second base bracket on an exposed side of a second vehicle wheel having a front side with a plurality of lug nuts holes surrounding a cylindrical central receptacle with a center hole, the second base bracket having a bracket diameter and the center hole having a center hole diameter being smaller than the second bracket diameter, the second base bracket adaptable to cover a second vehicle wheel having a plurality of lug nuts surrounding a center hole, with each of the plurality of lug nut holes having an opening diameter large enough to allow each of the plurality of lug nuts to pass therethrough;

a second plurality of interchangeable caps identical to the first cap and the second cap, interchangeably attachable to the front side of the second base bracket, wherein each of said second plurality of interchangeable caps results in changing the appearance of the second wheel;

a third base bracket on an exposed side of a third vehicle wheel having a front side with a plurality of lug nuts holes surrounding a cylindrical center receptacle with a center hole, the third base bracket having a bracket diameter and the center hole having a center hole diameter being smaller than the third bracket diameter, the third base bracket adaptable to cover a third vehicle wheel having a plurality of lug nuts surrounding a center hole, with each of the plurality of lug nut holes having an opening diameter large enough to allow each of the plurality of lug nuts to pass therethrough;

a third plurality of interchangeable caps identical the first cap and the second cap, interchangeably attachable to the front side of the third base bracket, wherein each of the third plurality of interchangeable brackets results in changing the appearance of the third wheel;

a fourth base bracket on an exposed side of a fourth vehicle wheel having a front side with a plurality of lug nuts holes surrounding a cylindrical center receptacle with a center hole, the second base bracket having a bracket diameter and the center hole having a center hole diameter being smaller than the second bracket diameter, the second base bracket adaptable to cover a vehicle wheel having a plurality lug nuts surrounding a center hole, with each of the plurality of lug nut holes having an opening diameter large enough to allow each of the plurality of lug nuts to pass therethrough; and a fourth plurality of interchangeable caps identical to the first cap and the second cap, interchangeably attachable to the front side of the fourth base bracket for changing the appearance of the fourth wheel.

3. The wheel assembly of claim 1, further comprising:
ball bearings between the interchangeable caps and the base bracket, the ball bearings supported by a rim on the rearwardly protruding cylindrical guide of the first cap and the second cap.

4. A base bracket for changing appearances of a wheel hub, the wheel hub having a plurality of lug nuts surrounding a center opening, the hub having a diameter smaller than a wheel rim about the hub, the space between the wheel hub and the wheel rim having a plurality of openings surrounding the wheel hub, comprising:

a base bracket on an exposed side of a wheel hub having a front side with a plurality of lug nut holes surrounding a cylindrical center receptacle with a center hole, the base bracket having a bracket diameter and the center hole having a center hole diameter, with each of the plurality of lug nut holes having an opening diameter large enough to allow each of the plurality of lug nuts to pass therethrough;

a plurality of interchangeable caps attachable to the front side of the base bracket, the interchangeable caps include:

a first cap having a centrally located rearwardly protruding cylindrical guide that is attachable within the cylindrical receptacle of the base bracket, the first cap for covering the center hole in the wheel while leaving the lug nut holes with lug nuts from the wheel exposed, the first-cap having a first cap diameter substantially similar to the center hole diameter; and a second cap having a diameter larger than the first cap, the second cap having a centrally located rearwardly protruding cylindrical guide that is attachable within the cylindrical receptacle of the base bracket, the second cap for covering both the center hole and the lug nut holes of the base bracket which covers the lug nuts from the wheel, the second cap having a diameter substantially similar to a diameter across the lug nut holes, wherein each of the first cap and the second cap has a different aesthetic or structure for changing the appearance of the wheel.

5. The base bracket of claim 4, further comprising:
a second base bracket on an exposed side of a second wheel hub having a front side identical to the front side of the first base bracket;

a second plurality of interchangeable caps attachable to the front side of the second base bracket, said second plurality of interchangeable caps identical to the first cap and the second cap, for changing the appearance of the second wheel hub when installed;

a third base bracket on an exposed side of a third wheel hub having a front side identical to the front side of the first base bracket;

a third plurality of interchangeable caps attachable to the front side of the third base bracket, said third plurality of interchangeable caps identical to the first cap and the second cap for changing the appearance of the third wheel hub;

a fourth base bracket on an exposed side of a fourth wheel hub having a front side identical to the front side of the first base bracket; and a fourth plurality of interchangeable caps attachable to the front side of the fourth base bracket adapted, said fourth plurality of interchangeable caps identical to the first cap and the second cap for changing the appearance of the fourth wheel hub.

6. The base bracket of claim 4, further comprising:
ball bearings between the interchangeable caps and the base bracket, the ball bearings supported by a rim on the rearwardly protruding cylindrical guide of the first cap and the second cap.

7. A wheel assembly for a vehicle, comprising:
a base bracket having a front side with a cylindrical center receptacle with a center hole and a plurality of lug nut holes surrounding the cylindrical center receptacle, the base bracket having a bracket diameter and the center hole having a center hole diameter, the base bracket adaptable to cover a vehicle wheel having a plurality of lug nuts surrounding a center hole, with each of the plurality of lug nut holes having an opening diameter large enough to allow each of the plurality of lug nuts to pass therethrough; and a plurality of interchangeable caps attachable to the front side of the bracket, the plurality of interchangeable caps comprising:

a first cap having a centrally located rearwardly protruding cylindrical guide with a solid cylinder shape that is attachable within the cylindrical receptacle of the base bracket, the first cap for covering the center hole in the wheel, the first cap having a first cap diameter substantially similar to the center hole diameter; and a second cap having a diameter larger than the first cap, the second cap having a centrally located rearwardly protruding cylindrical guide with a solid cylinder shape that is attachable within the cylindrical receptacle of the base bracket, the second cap for covering both the center hole and the base bracket, wherein interchanging said first cap and the second cap with each other results in changing the aesthetic appearance of the wheel.

8. The wheel assembly of claim 7, further comprising:

ball bearings between the interchangeable caps and the base bracket, the ball bearings supported by a rim on the rearwardly protruding cylindrical guide of the first cap and the second cap.

* * * * *